US011665212B2

(12) United States Patent
Chiang et al.

(10) Patent No.: US 11,665,212 B2
(45) Date of Patent: May 30, 2023

(54) TIMER-INITIATED FALLBACK

(71) Applicant: T-Mobile USA, Inc., Bellevue, WA (US)

(72) Inventors: Hsin-Fu Henry Chiang, Bellevue, WA (US); Zeeshan Jahangir, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 573 days.

(21) Appl. No.: 16/513,579

(22) Filed: Jul. 16, 2019

(65) Prior Publication Data

US 2021/0021646 A1  Jan. 21, 2021

(51) Int. Cl.
*H04L 65/1104* (2022.01)
*H04L 65/1016* (2022.01)
*H04W 28/02* (2009.01)

(52) U.S. Cl.
CPC ...... *H04L 65/1104* (2022.05); *H04L 65/1016* (2013.01); *H04W 28/0236* (2013.01); *H04W 28/0268* (2013.01)

(58) Field of Classification Search
CPC .................................................. H04L 65/1006
See application file for complete search history.

(56) References Cited

U.S. PATENT DOCUMENTS

| 2010/0074109 | A1* | 3/2010 | Klingenbrunn | H04W 76/10 |
| | | | | 370/230 |
| 2012/0155282 | A1 | 6/2012 | Dorenbosch | |
| 2014/0211619 | A1 | 7/2014 | Suryavanshi et al. | |
| 2017/0013529 | A1* | 1/2017 | Persson | H04W 72/087 |
| 2018/0007550 | A1 | 1/2018 | Williams et al. | |
| 2018/0175970 | A1* | 6/2018 | Jung | H04W 48/18 |
| 2018/0263066 | A1* | 9/2018 | Chiang | H04L 65/1016 |
| 2019/0149583 | A1* | 5/2019 | Jutila | H04L 65/1073 |
| | | | | 455/435.1 |
| 2019/0150039 | A1* | 5/2019 | Raghunathan | H04L 65/4007 |
| | | | | 370/331 |
| 2020/0245195 | A1* | 7/2020 | Zhu | H04W 36/12 |
| 2020/0267606 | A1* | 8/2020 | Huang-Fu | H04W 28/0257 |
| 2020/0305032 | A1* | 9/2020 | Kuppelur | H04W 76/50 |

(Continued)

FOREIGN PATENT DOCUMENTS

EP  3462776 A1  4/2019
WO  WO2019011107 A1  1/2019

OTHER PUBLICATIONS

3GPP, "3GPP Technical Specification Group Services and System Aspects; System Architecture for the 5G System; Stage 2 (Release 16)", vol. SA WG2, No. V16.1.0, Jun. 11, 2019, pp. 1-368.

(Continued)

*Primary Examiner* — Abdeltif Ajid
(74) *Attorney, Agent, or Firm* — Lee & Hayes, P.C.

(57) ABSTRACT

Systems, devices, and techniques described herein relate to timer-initiated fallback. In an example method, a message associated with Quality of Service (QoS) sensitive services is received from a core network. In response to receiving the message, a timer is initiated. If the timer expires without having received a confirmation that a dedicated tunnel associated with the QoS-sensitive services has been established in the first core network, then a fallback process can be initiated.

20 Claims, 8 Drawing Sheets

(56) References Cited

U.S. PATENT DOCUMENTS

2020/0336979 A1* 10/2020 Aoyagi .............. H04L 65/1069
2021/0022197 A1   1/2021 Chiang

OTHER PUBLICATIONS

Extended European Search Report dated Oct. 23, 2020 for European Patent Application No. 20181631.1, 11 pages.
Extended European Search Report dated Oct. 28, 2020 for European Patent Application No. 20181636.0, 11 pages.
Motorola Mobility et al, "Support of EPS Fallback for voice without impacting IMS", vol. SA WG2, No. S2-185409, May 28, 2018, 8 pages.
Office Action for U.S. Appl. No. 16/513,460 dated May 5, 2021, Chiang,Hsin Fu Henry "Automatically Resetting Interrupted Network Connections", 17 pages.
European Office Action dated Nov. 16, 2022 for European Patent Application No. 20181631.1, a foreign counterpart to U.S. Pat. No. 11,284,463, 9 pages.

* cited by examiner

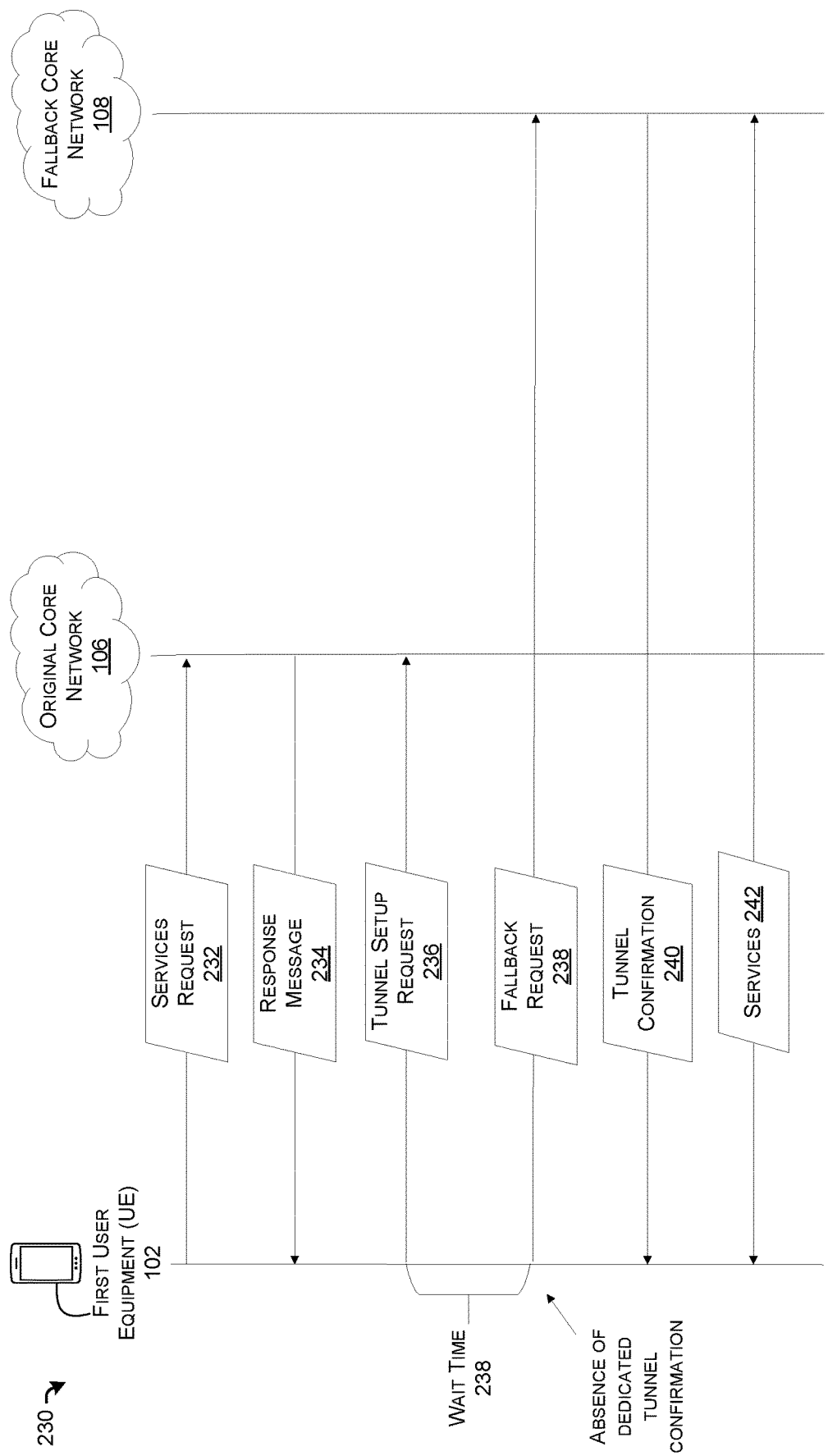

TIMER-INITIATED FALLBACK

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2C illustrates example signaling for falling back to an alternate core network when a UE-initiated dedicated tunnel is not established before a timer expires.

DETAILED DESCRIPTION

Figure 1:
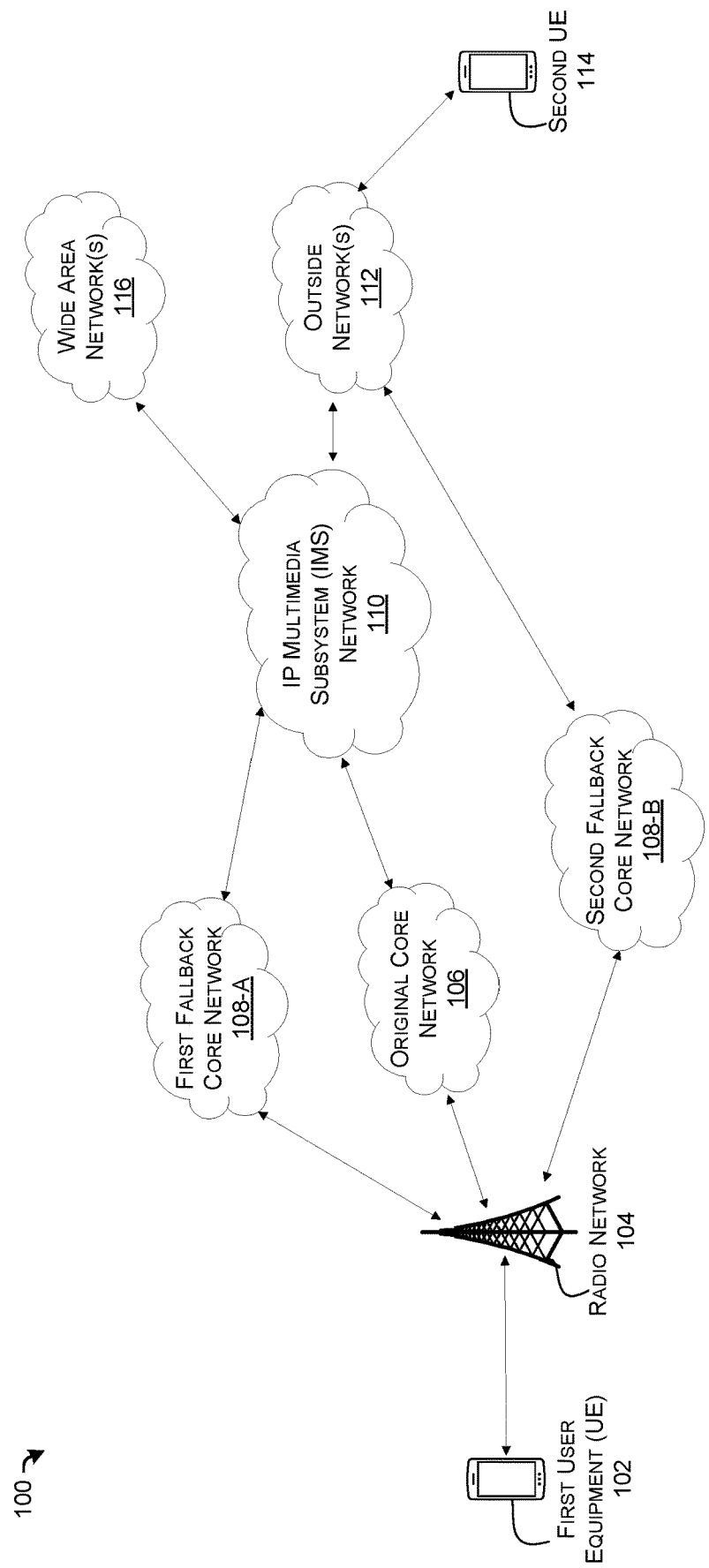
FIG. 1 illustrates an example network environment for performing User Equipment (UE)-initiated fallback based on a timer.

The systems, devices, and techniques described herein relate to timer-based fallback. Various implementations relate to User Equipment (UE)-initiated fallback solutions for the delivery of Quality of Service (QoS)-sensitive data traffic.

Various types of data traffic can be allocated resources to maintain pre-determined minimum QoS levels. In particular examples, a QoS Class Identifier (QCI) can be associated with a type of data traffic. The QCI can indicate whether the data traffic should be delivered via a Guaranteed Bit Rate (GBR), should be prioritized over other types of data traffic, should be delivered no more than a particular packet delay, should be delivered according to a maximum packet error loss rate, or the like.

A delivery network can enforce a particular QoS level associated with a type of data traffic by establishing a dedicated tunnel and delivering the data traffic via the dedicated tunnel. In certain 4th Generation (4G) environments, a dedicated tunnel can be a dedicated bearer. In certain 5th Generation (5G) environments, a dedicated tunnel can be a dedicated 5G Quality Indicator (5QI) data flow.

In various implementations, a dedicated tunnel can be established "end to end" throughout one or more networks. For instance, when QoS-sensitive services are requested by a particular UE, a dedicated tunnel can be established through a radio network directly connected to the UE, an Internet Protocol (IP) Multimedia Subsystem (IMS) network providing the services, and a core network connected between the radio network and the IMS network.

A dedicated tunnel can be UE-initiated or network-initiated. In a UE-initiated scenario, the UE itself requests various features of the dedicated tunnel, such as a priority, packet delay budget, packet error loss rate, or the like, which are associated with the dedicated tunnel. However, in the case of a network-initiated dedicated tunnel, the network may assign the features of the dedicated tunnel (e.g., the priority, packet delay budget, packet error loss rate, or the like) based on the type of services requested by the UE and various conditions of the network. Network-initiated dedicated tunnels can be advantageous, because the network can intelligently allocate network resources to different types of data traffic and can adjust allocations of network resources in cases where the network resources are limited. However, UE-initiated dedicated tunnels may be implemented in certain 3rd Generation Partnership Project (3GPP) standards.

The establishment of UE-initiated and network-initiated dedicated tunnels can be delayed, interrupted, or can otherwise fail after initiation. In some cases, the resources necessary to support a requested dedicated tunnel may be unavailable in a delivery network. For example, a core network can be too congested to support a particular GBR associated with a requested type of data traffic. In particular examples, a node or an interface between two nodes involved in establishing the dedicated tunnel can be interrupted (e.g., misaligned, etc.). For instance, a User Plane Function (UPF) in a 5G core network selected to be part of the dedicated tunnel may fail.

If the dedicated tunnel is not established, a fallback solution may be initiated. In some cases, the establishment of the dedicated tunnel can be abandoned in a first delivery network and, instead, the establishment of the dedicated tunnel can be initiated in a second delivery network. When the second delivery network is a Circuit-Switched (CS) network (e.g., a 2G network or a 3G network), the fallback solution may be referred to as "CS-fallback."

In certain examples, the network initiates the fallback solution. However, when the problem preventing the establishment of the dedicated tunnel is a problem with the network itself, the fallback solution may be unnecessarily delayed.

Various implementations of the present disclosure relate to UE-initiated fallback solutions. In particular implementations, a UE initiates a timer that, when expired, causes the UE to initiate a fallback solution. The timer may be initiated at a time based on whether the UE and/or the delivery network is implementing a policy in which the dedicated tunnel is UE-initiated or a policy in which the dedicated tunnel is network-initiated. In examples in which a dedicated tunnel is UE-initiated, the timer can start in response to the UE transmitting a request for the dedicated tunnel to a delivery network. In instances in which the dedicated tunnel is network-initiated, the timer can start in response to the UE receiving the service request acknowledgement from the network, which can be the first response message from the network that is an indication that the dedicated tunnel is being initiated by the delivery network.

In some instances, the fallback solution can include falling back to an alternative dedicated tunnel with less-stringent QoS requirements. For instance, if a dedicated tunnel is initially sought at a first QoS level and the timer expires, the UE may cause the establishment of an alternative dedicated tunnel at a second QoS level that requires fewer reserved resources than the first QoS level. In some cases, the UE may forward a "counter-offer" to the delivery network identifying that the second QoS level is acceptable. In some cases, the delivery network may be able to establish the dedicated tunnel at the second QoS level even though it cannot establish the dedicated tunnel at the first QoS level. Thus, even if the UE and/or the delivery network initially require the dedicated tunnel to be network-initiated, the UE may be empowered to initiate the creation of a fallback dedicated tunnel. In some cases, the UE can forward the counter-offer, and thereby have at least some control over the establishment of a subsequent dedicated tunnel, even when the UE and the delivery network are implementing a network-initiated dedicated tunnel policy. Thus, in certain implementations, the UE and/or the delivery network can transition from a network-initiated default policy to a UE-initiated policy as a fallback to the default policy.

In certain implementations, the fallback solution can include falling back to a different network technology. For instance, if a dedicated tunnel is initially sought in a 5G network and the timer expires, the UE may cause the establishment of an alternative dedicated tunnel in an available fallback network, such as an available 4G network, an available 3G network, or an available 2G network. In some cases, the UE may forward a request for services to the fallback network.

Various implementations of the present disclosure provide solutions to various problems with telecommunication networks. A timer initiated by the UE can enable the UE to identify when there is a problem with a process of establishing a dedicated tunnel. Accordingly, the UE can initiate the fallback option, rather than relying entirely on the delivery network to initiate the fallback option. The UE can therefore successfully receive QoS-sensitive services via a fallback dedicated tunnel, even if the delivery network fails to successfully initiate fallback. Furthermore, the UE can more efficiently establish the dedicated tunnel, particularly when the delivery network is delayed in, or prevented from, establishing an initial dedicated tunnel.

Various triggering events for the timers described herein can provide improvements to telecommunication networks. In the context of policies specifying that dedicated tunnels are UE-initiated, a timer may be initiated in response to the UE transmitting a tunnel setup request to the delivery network. In the context of policies specifying that dedicated tunnels are network-initiated, a timer may be initiated in response to a triggering event at which the indication that a dedicated bearer will be established is received from the delivery network. These triggering events can also allow the UE to specifically identify that there is a problem with establishing the dedicated tunnel, as opposed to some other problem. For instance, these triggering events can make the UE more likely to identify that there is a problem with the establishment of the dedicated tunnel, rather than a fundamental problem associated with a radio access network or the delivery network itself. In various examples, the timer can be shorter and therefore take up fewer computing resources on the part of the UE, as compared to situations in which the UE initiates the timer in response to the UE initially requesting services.

Furthermore, certain fallback solutions described herein provide other improvements to telecommunication networks. In some examples, the UE may initiate a fallback solution that uses the existing delivery network. According to particular implementations, the UE can cause a fallback dedicated tunnel to be established in the same delivery network that failed to establish a dedicated tunnel at a first QoS level, by indicating that a second QoS level is acceptable. Accordingly, fallback can be performed even when an alternative delivery network (e.g., a CS network) is unavailable.

Various implementations of the present disclosure will now be described with reference to the accompanying drawings.

FIG. 1 illustrates an example network environment 100 for performing User Equipment (UE)-initiated fallback based on a timer.

A first User Equipment (UE) 102 may be connected to a radio network 104. In some implementations, the first UE 102 may be connected to the radio network 104 via a wireless interface. As used herein, the terms "UE," "user device," "wireless communication device," "wireless device," "communication device," "mobile device," and "client device," can be used interchangeably herein to describe any UE (e.g., the first UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, the first UE 102 can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like.

The first UE 102 may transmit and receive data wirelessly with the radio network 104 via one or more radio interfaces. The radio network 104 may be a Radio Access Network (RAN). In this manner, the radio network 104 can include and/or be substituted for a 3GPP RAN, such a GSM/EDGE RAN (GERAN), a Universal Terrestrial RAN (UTRAN), or an Evolved UTRAN (E-UTRAN), or alternatively, via a "non-3GPP" RAN, such as a Wi-Fi RAN, or another type of wireless local area network (WLAN) that is based on the IEEE 802.11 standards. In some instances, the radio network 104 can include a Wi-Fi Access Point (AP). Although not illustrated, the environment 100 can further include any number and type of base stations representing any number and type of macrocells, microcells, picocells, or femtocells, for example, with any type or amount of overlapping coverage or mutually exclusive coverage compared to the radio network 104.

The radio network 104, in turn, may be connected to an original core network 106, a first fallback core network 108-A, and a second fallback core network 108-B. In some cases, one of the first fallback core network 108-A or the second fallback core network 108-B may be omitted from the environment 100. The original core network 106 and/or the first fallback core network 108-A may include a 4G core network. In certain instances, various components of a 4G core network, such as an Evolved Packet Core (EPC), can include, but are not limited to, a Mobility Management Entity (MME), a Serving Gateway (SGW), a Packet Data Network (PDN) Gateway (PGW), a Home Subscriber Server (HSS), an Access Network Discovery and Selection Function (ANDSF), and/or an evolved Packet Data Gateway (ePDG). An SGW can include a component that handles user-plane data (SGW-U) and a component that handles control-plane data (SGW-C). A PDN can include a component that handles user-plane data (PDN-U) and a component that handles control-plane data (PDN-C). The EPC may further include a Policy and Charging Rules Function (PCRF). Each entity, gateway, server, and function in the 4G core network can be implemented by specialized hardware (e.g., one or more devices), general hardware executing specialized software (e.g., at least one virtual machine executed on one or more devices), or the like.

In some implementations, the original core network 106 and/or the first fallback core network 108-A may include a 5G core network. In some examples, various components of a 5G core network can include, but are not limited to, a Network Exposure Function (NEF), a Network Resource Function (NRF), an Authentication Server Function (AUSF), an Access and Mobility management Function (AMF), a Policy Control Function (PCF), a Session Management Function (SMF), a Unified Data Management (UDM) function, a User Plane Function (UPF), and/or an Application Function (AF). Each entity, gateway, server, and function in the 5G core network can be implemented by specialized hardware (e.g., one or more devices), general hardware executing specialized software (e.g., at least one virtual machine executed on one or more devices), or the like.

In general, the NEF can be implemented as a network function including functionality to securely expose services and/or capabilities provided by and amongst the various network functions, as discussed herein. In some instances, the NEF receives information from other network functions in the 5G core and can store the received information as structured data using an interface to a data storage network function.

In general, the AUSF can be implemented as a network function including functionality to provide authentication to various devices in the network. For example, the AUSF can request device credentials (e.g., security key(s)), verify that the first UE 102 is authorized to connect to a network, and/or control access to the network based on the device credentials.

In general, the NRF can be implemented as a network function including functionality to support service discovery (e.g., receive a network function discovery request and provide information associated with the discovered network function instances to a requesting entity). In some instances, the NRF can receive utilization information, capability information, etc. from various network functions, such as the UPF, to provide such utilization information to the other components discussed herein. Further, the NRF can select, assign, implement, or otherwise determine network functions to be used in a network based at least in part on utilization information, as discussed herein.

In general, the AMF can be implemented as a network function including functionality to provide UE-based authentication, authorization, mobility management, etc., to various UEs. In some instances, the AMF can include functionality to terminate a RAN control plane interface between the first UE 102 and other functions on the network. In some instances, the AMF can include functionality to perform registration management of the first UE 102 in the network, connection management, reachability management, mobility management, access authentication, access authorization, security anchor functionality (e.g., receiving and/or transmitting security keys during registration/authorization), and the like.

In general, the PCF can be implemented as a network function including functionality to support unified policy framework to govern network behavior, provide policy rules to control plane functions and/or enforce such rules, and/or implement a front end to access subscription information relevant for policy decisions in a data repository.

In general, the SMF can be implemented as a network function including functionality to manage communication sessions by and between UEs, and/or to provide Internet Protocol (IP) addresses to the UEs. In some instances, the SMF can select a UPF to provide services to the first UE 102 in response to receiving a request for services from the first UE 102.

In general, the UDM can be implemented as a network function including functionality to process authentication credentials, handle user identification processing, manage registration and/or mobility, manage subscriptions between the first UE 102 and a carrier, and/or manage Short Message Service (SMS) data.

In general, the UPF can be implemented as a network function including functionality to control data transfer between the first UE 102 and the various components of the environment 100. In some instances, the UPF can include functionality to act as an anchor point for radio access technology (RAT) handover (e.g., inter and intra), external protocol data unit (PDU) session point of interconnect to an external network (e.g., the Internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs, which are associated with the core network 106 and/or with the first UE 102

In general, the AF can be implemented as a network function including functionality to route traffic to/from applications operating on the network, facilitate accessing the NEF, and interact with the policy framework for policy control in connection with the PCF.

In some implementations, the second fallback core network 108-B may include a Circuit Switched (CS) network. For instance, the second fallback core network 108-B may include a 2G core network or a 3G core network.

In various examples, the original core network 106, the first fallback core network 108-A, and the second fallback core network 108-B are associated with different types of network technology. For instance, the original core network 106 may be a 5G core network and the first fallback core network 108-A may be a 4G core network (e.g., an EPC). In particular implementations, the original core network 106 may be associated with a more advanced technology than the first fallback core network 108-A and/or the second fallback core network 108-B. That is, the original core network 106 may be associated with a more recently developed technology (e.g., 5G) than a technology of the first fallback core network 108-A (e.g., 4G) or the second fallback core network 108-B (e.g., 3G or 2G).

The original core network 106 and the first fallback core network 108-A may be connected to an Internet Protocol (IP) Multimedia Subsystem (IMS) network 110. In cases in which the second fallback core network 108-B is a CS network, the second fallback core network 108-B may be disconnected from the IMS network 110 and may be connected directly to the outside network(s) 112 and/or the WANs 116. However, in cases in which the first fallback core network 108-A is not a CS network, the first fallback core network 108-A may be connected to the IMS network 110. The IMS network 110 may be referred to an "IMS core network," an "IMS CN Subsystem," or the like. IMS is an architectural framework defined by the 3rd Generation Partnership Project (3GPP) for delivering IP multimedia to a UE, such as the first UE 102. The IMS network 110 can be maintained and/or operated by one or more service providers, such as one or more wireless carriers ("carriers"), that provide IMS-based services to users who are associated with UEs, such as the first UE 102. For example, a service provider can offer multimedia telephony services that allow a user to call or message other users via the IMS network 108 using his/her UE. A user can also utilize an associated UE to receive, provide, or otherwise interact with various different IMS-based services by accessing the IMS network 110. It is to be appreciated that any number of base stations and/or nodes can be included in the IMS network 110.

Accordingly, an operator of the IMS network 110 can offer any type of IMS-based service, such as, telephony services, emergency services (e.g., E911), gaming services, instant messaging services, presence services, video conferencing services, social networking and sharing services, location-based services, push-to-talk services, and so on. In order for a UE (e.g., the first UE 102) to access these services (e.g., telephony services), the UE may be configured to request establishment of a communication session, or another UE (e.g., the second UE 114) may be configured to request establishment of the communication session. In the case of telephony services, the communication session can comprise a voice call (e.g., a voice-based communication session, such as a VoLTE call, or a Wi-Fi call), a video call, or the like.

The radio network 104, the original core network 106, the first fallback core network 108-A, the second fallback core network 108-B, and/or the IMS network 110 may be managed by the same operator, in some cases. According to various implementations, the first UE 102 may be associated with a subscriber account corresponding to an operator of at least one of the radio network 104, the original core network 106, the first fallback core network 108-A, the second fallback core network 108-B, or the IMS network 110.

The IMS network 110 may be connected to at least one outside network 112. The outside network(s) 112 may be used to connect the IMS network 110 to a second UE 114. In some examples, services exchanged in a communication session between the first UE 102 and the second UE 114 may traverse the radio network 104, the original core network 106, the IMS network 110, and the outside network(s) 112. According to certain examples, services exchanged in a communication session between the first UE 102 and the second UE 114 may traverse a pathway including the radio network 104, the first fallback core network 108-A, the IMS network 110, and the outside network(s) 112. In certain cases, services exchanged in a communication session between the first UE 102 and the second UE 114 may traverse a pathway including the radio network 104, the second fallback core network 108-B, and the outside network(s) 112.

A pathway carrying the services may correspond to a dedicated tunnel, in instances where the services are QoS-sensitive services. In some cases, the outside network(s) 112 may include one or more outside IMS networks, one or more outside core networks, and/or one or more radio networks. The second UE 114 may be associated with a subscriber account corresponding to the outside network(s) 112. For instance, the second UE 114 may be associated with a subscriber account corresponding to a core network in the outside network(s) 112.

The IMS network 110 may also be connected to at least one Wide Area Network (WAN) 116, such as the Internet. In various implementations, various multimedia services can be provided to the first UE 102 from one or more content servers in the WAN 116 via a pathway through the radio network 104, the original core network 106 and/or the first fallback core network 108-A, and the IMS network 110. Although not illustrated, in some cases, the second fallback core network 108-B may be connected to the WAN 116, such that the second fallback core network 108-B may provide Internet-based services to the first UE 102.

In particular implementations, the first UE 102 may transmit a request, to the original core network 106, for services associated with a particular Quality of Service (QoS) level. These services may be requested as part of a communication session with the second UE 114, for example. As used herein, the terms "communication session," "session," and their equivalents, can refer to an exchange of data between two or more communicating nodes or devices. A call (e.g., a voice call, a video call, or the like) may be an example of a communication session. A communication session can be temporary, such that it is established at a first time and ceased at a second time. In various implementations, a communication session includes the transfer of user plane data between two or more nodes. In some examples, a call can be established between a caller and a callee. In certain cases, a session can be established between a UE (e.g., the first UE 102) and a content server (e.g., a content server associated with the WAN 116). According to particular implementations, a call may be supported by a dedicated tunnel over which the services are delivered in the call. As used herein, the term "caller," and its equivalents, can refer to a device initiating a session. According to some implementations, the session may provide services to and from the caller. The session can be a communication session. In some cases, the caller may initiate a session with a callee. As used herein, the term "callee," and its equivalents, can refer to a device receiving a request to participate in a communication session with a caller.

As used herein, the term "node," and its equivalents, can refer to one or more devices that transmit and/or receive data in a network. In some instances, a first node can transmit and/or receive data from a second node. For instance, a UE (e.g., the first UE 102) receiving services from an IMS network (e.g., the IMS network 110) may be a node. In some cases, a UPF (e.g., in the original core network 106) through which services are exchanged between an IMS network and a UE can also be considered a node.

The original core network 106 may establish a pathway through the original core network 106 and the IMS network 110 over which the services can be delivered to the first UE 102. In some cases, the pathway may further include at least one of the radio network 104, the outside network(s) 112, or the WAN(s) 114. As used herein, the terms "network path," "path," and their equivalents, can refer to a pathway over which data can be transferred between at least two terminal nodes or devices (e.g., a caller and a callee). In some cases, a path may include one or more intermediary nodes and/or one or more interfaces between the terminal nodes.

In various implementations, the first UE 102 may register with the IMS network 108 via an IMS registration process. In some cases, the IMS registration process occurs in response to the initial request for services. In certain cases, the IMS registration process can occur prior to the first UE 102 transmitting the request for services. During the IMS registration process, a path between the original core network 106 and the IMS network 110, by which the first UE 102 can be provided services, may be established. In particular, various interfaces associated with the original core network 106 and/or the IMS network 110 can be allocated for multimedia services destined for or originating from the first UE 102. In various examples in which the original core network 106 is an EPC, these interfaces can include, for instance, at least one of a Gx interface (e.g., an interface connecting the SGW or PGW to the PCRF), an Rx interface (e.g., an interface connecting the PCRF to the I/S-CSCF in the IMS network), an Sgi interface (e.g., an interface connecting the SGW or PGW to the P-CSCF in the IMS network), or the like. In certain examples in which the original core network 106 is a 5G core network, these interfaces can include, for instance, at least one of an N3 interface (e.g., an interface connecting the radio network 104 and a UPF) or an N5 interface (e.g., an interface connecting the UPF to another network, such as the IMS network 110).

In some cases, the first UE 102 and/or the original core network 106 may identify that a dedicated tunnel should be established through the original core network 106 and the IMS network 110 for the services requested by the first UE 102. At least one of the first UE 102, the radio network 104, the original core network 106, or the IMS network 110 may implement a policy indicating that the dedicated tunnel should be established via a UE-initiated process or a network-initiated process. The policy may be set by a carrier, in some cases. In particular implementations, the policy may be implemented in software and/or hardware in at least one of the first UE 102, the radio network 104, the original core network 106, or the IMS network 110. A policy can indicate that a dedicated tunnel should be "UE-initiated" when the policy indicates that a UE specifies and/or sets the requirements (e.g., reserved network resources, a GBR, or the like) of the dedicated tunnel to an applicable delivery network. A policy can indicate that a dedicated tunnel should be "network-initiated" when the policy indicates that a delivery network specifies and/or sets the requirements (e.g., reserved network resources, a GBR, or the like) of the dedicated tunnel for the UE. As used herein, the term "dedicated tunnel," "dedicated bearer for service media," and their equivalents, can refer to at least one of (i) a pathway through at least one network or (ii) reserved resources allocated to a particular session traversing the network(s). In some cases, the policy implemented by the first UE 102, the radio network 104, the original core network 106, and/or the IMS network 110 may switch between a UE-initiated policy and a network-initiated policy in response to an implementation received from a carrier (e.g., a message distributed through the environment 100 from at least one server in the outside network(s) 112 and/or the WAN(s) 116). An applicable policy may affect how the first UE 102 and/or the original core network 106 initialize a dedicated bearer and initiate a fallback solution.

In some cases, the first UE 102 may identify that the services are associated with the particular QoS level. In particular implementations, the original core network 106 may determine that the requested services should be delivered via the particular QoS level. As used herein, the term "QoS level," and its equivalents, can refer to at least one required (e.g., a minimum or maximum) metric associated with a type of QoS-sensitive data traffic. In a 3GPP LTE network, the QoS level may be associated with a QoS Class Identifier (QCI). In some 5G core networks, the QoS level may be associated with a 5G QoS Identifier (5QI). A type of services or data traffic associated with a QoS level may be referred to as "QoS-sensitive." In various implementations, a QoS level can correspond to at least one of a priority of the services as they are transmitted through a delivery network (e.g., as compared to other services transmitted through a core network, the IMS network 110, or a combination thereof), a maximum packet delay budget of the services (e.g., maximum allowable delay(s) by one or more nodes and/or interfaces through the delivery network), or a maximum packet error loss rate of the services (e.g., a maximum rate of bit errors added to bits in data packets comprising the services after they are transmitted through the delivery network).

According to particular implementations, a QoS level may be associated with at least one of a priority of the type of data traffic through one or more networks, a maximum packet delay budget of the type of data traffic, a maximum packet delay budget of the type of data traffic, a Guaranteed Bit Rate (GBR) of the type of data traffic, or the like. In certain implementations, a type of data traffic associated with a particular QoS level is delivered across one or more networks (e.g., the original core network 106, the first fallback core network 108-A, or the second fallback core network 108-B and/or the IMS network 110) via a dedicated tunnel. As used herein, the term "GBR," and its equivalents, can refer to a type of data traffic that may be transferred through at least one network by at least a minimum bit rate. In some cases, GBR data traffic corresponds to the type of services associated with the data traffic. According to 3GPP specifications, examples of GBR services can include conversational voice, conversational video (e.g., live streaming), real-time gaming, certain V2X messaging, non-conversational video (e.g., buffered streaming), mission critical user plane Push to Talk (PTT) voice, certain Mission Critical user plane Push to Talk Voice (MCPTT), non-mission-critical user plane, or the like. However, for the purposes of this disclosure, GBR services can include any predefined set of services that are sensitive to network delays and/or any other services that should be prioritized by at least one network (e.g., the radio network 104, the original core network 106, and/or the IMS network 110) delivering the services.

In certain examples in which a UE-initiated policy is applicable, the first UE 102 may request, to the original core network 106, that a dedicated tunnel should be established for the services. For instance, the UE 102 may transmit a request for the dedicated tunnel, which may specify a GBR of the dedicated tunnel, to the original core network 106. Pursuant to the UE-initiated policy, the original core network 106 may at least attempt to establish the dedicated tunnel based on the request from the first UE 102.

In certain examples in which a network-initiated policy is applicable, the original core network 106 may identify that a dedicated tunnel should be established for the services. The original core network 106 may further attempt to establish the dedicated tunnel based on the particular QoS level associated with the services.

Regardless of whether the dedicated tunnel is UE-initiated or network-initiated, the dedicated tunnel may be sought through nodes in one or more of the radio network 104, the original core network 106, the first fallback core network 108-A, and the IMS network 110. In particular implementations disclosed herein, the original core network 106 may at least attempt to establish the dedicated tunnel through the original core network 106 and the IMS network 110. According to some examples, a dedicated tunnel may refer to a dedicated bearer (e.g., for data traffic traversing an EPC), a dedicated 5QI flow (e.g., for data traffic traversing a 5G core network), or the like.

In various implementations, the original core network 106 may transmit, to the first UE 102 an indication that the dedicated tunnel is being established. In some cases, the indication can be a SIP message. For instance, the first UE 102 may receive a SIP 100 Trying response indicating that the dedicated tunnel is being established. In some cases, the original core network 106 may transmit a Bearer Setup Request to the radio network 104, and the radio network 104 may, in response, transmit a Radio Resource Control (RRC) Connection Reconfiguration corresponding to the Bearer Setup Request to the first UE 102. In some examples in which a network-initiated policy is implemented, the indication that the dedicated tunnel is being established may identify a minimum QoS level that the dedicated tunnel should guarantee.

In some UE-initiated policies, the first UE 102 may initiate a timer in response to transmitting the initial request for services and/or in response to transmitting a request for a dedicated tunnel. Pursuant to certain network-initiated policies, upon receiving the indication that the dedicated tunnel is being established, the first UE 102 may start a timer. In various implementations, the timer may be count down a wait time. As used herein, the term "wait time," and its equivalents, can refer to a time interval by which a device waits before causing a connection associated with at least one network to be reset. In various implementations, a wait time can be predetermined. For instance, the first UE 102 may prestore the wait time by the time the first UE 102 receives the indication that the dedicated tunnel is being established. In some cases, a length of the wait time can depend on various temporary conditions of an associated network (e.g., a congestion level in the original core network 106 and/or the IMS network 108). In some cases, the wait time can be between about 1 second and about 1 minute. In particular implementations, the wait time can be between about 5 seconds and about 30 seconds. In specific examples, the wait time may be about 12 seconds. As used herein, the term "about" can refer to a range of ±10% of an applicable base value. For example, "about 1" can refer to a range of 0.9 to 1.1, inclusive.

If the first UE 102 receives information indicating that the dedicated tunnel has been established (e.g., context information about a dedicated tunnel established through the radio network 104, the original core network 106, and the IMS network 110) before the timer expires, the first UE 102 may stop the timer and receive services via the established dedicated tunnel. However, if the first UE 102 does not receive information that the dedicated tunnel has been established when the timer expires, the first UE 102 may automatically initiate a fallback process. The first UE 102 may initiate the fallback process regardless of whether a UE-initiated policy or a network-initiated policy is implemented.

In some instances, the fallback process may include the first UE 102 transmitting a counter-offer to the original core network 106. This fallback process can be successful even when the first fallback core network 108-A and the second fallback core network 108-B are unavailable. The counter-offer may specify a less stringent QoS level for the services than the QoS level initially identified by first UE 102 (e.g., pursuant to a UE-initiated policy) or the original core network 106 (e.g., pursuant to a network-initiated policy) for the dedicated tunnel. For example, the counter-offer may indicate that the first UE 102 will accept a packet delay budget of 150 ms for the dedicated tunnel even though the original core network 106 previously indicated that the dedicated tunnel should correspond to a packet delay budget of no more than 100 ms. According to some implementations, the QoS level specified by the counter-offer can be determined by the first UE 102 according to one or more predefined rules, user preferences, or the like. In some cases, the first UE 102 may generate the counter-offer based on the minimum QoS level identified in the indication that the dedicated tunnel is being established, as received from the original core network 106. For example, a subscriber associated with the first UE 102 may identify that a particular latency level is acceptable for streaming video services, even if a delivery network (e.g., the original core network 106 and/or the IMS network 110) to which the subscriber is subscribed generally guarantees a lower latency level for streaming video services. In some cases, the original core network 106 may be able to establish a dedicated tunnel at the less stringent QoS level even though the original core network 106 may be unable to establish a dedicated tunnel at the originally identified QoS level. For example, the original core network 106 may be significantly congested, and cannot reserve the resources required to accommodate a dedicated tunnel at the originally identified QoS level identified for the services, but the original core network 106 may have enough free capacity to accommodate a dedicated tunnel at the less stringent QoS level. In particular implementations in which the fallback option includes transmitting the counter-offer specifying the less stringent QoS level, the less stringent QoS level can be referred to as a "fallback QoS level."

In particular instances, the fallback process may include the first UE 102 transmitting a request for the services to the first fallback core network 108-A or the second fallback core network 108-B. This fallback process can be successful even when the original core network 106 is malfunctioning. In some cases, the first fallback core network 108-A or the second fallback core network 108-B may be able to establish a dedicated tunnel for the services even when the original core network 106 cannot. For example, at least one node in the original core network 106 may be malfunctioning, such that the original core network 106 may be unable to establish an appropriate dedicated tunnel for the services, but the first fallback core network 108-A or the second fallback core network 108-B may have enough free capacity to accommodate an appropriate dedicated tunnel for the services. In particular implementations in which the fallback process includes transmitting the request to the first fallback core network 108-A or the second fallback core network 108-B, the first fallback core network 108-A or the second fallback core network 108-B can also be referred to as a "fallback network."

Regardless of the type of fallback process performed, an appropriate dedicated tunnel may be established. Accordingly, the first UE 102 may be able to receive the requested services via the dedicated tunnel.

Figure 2A:
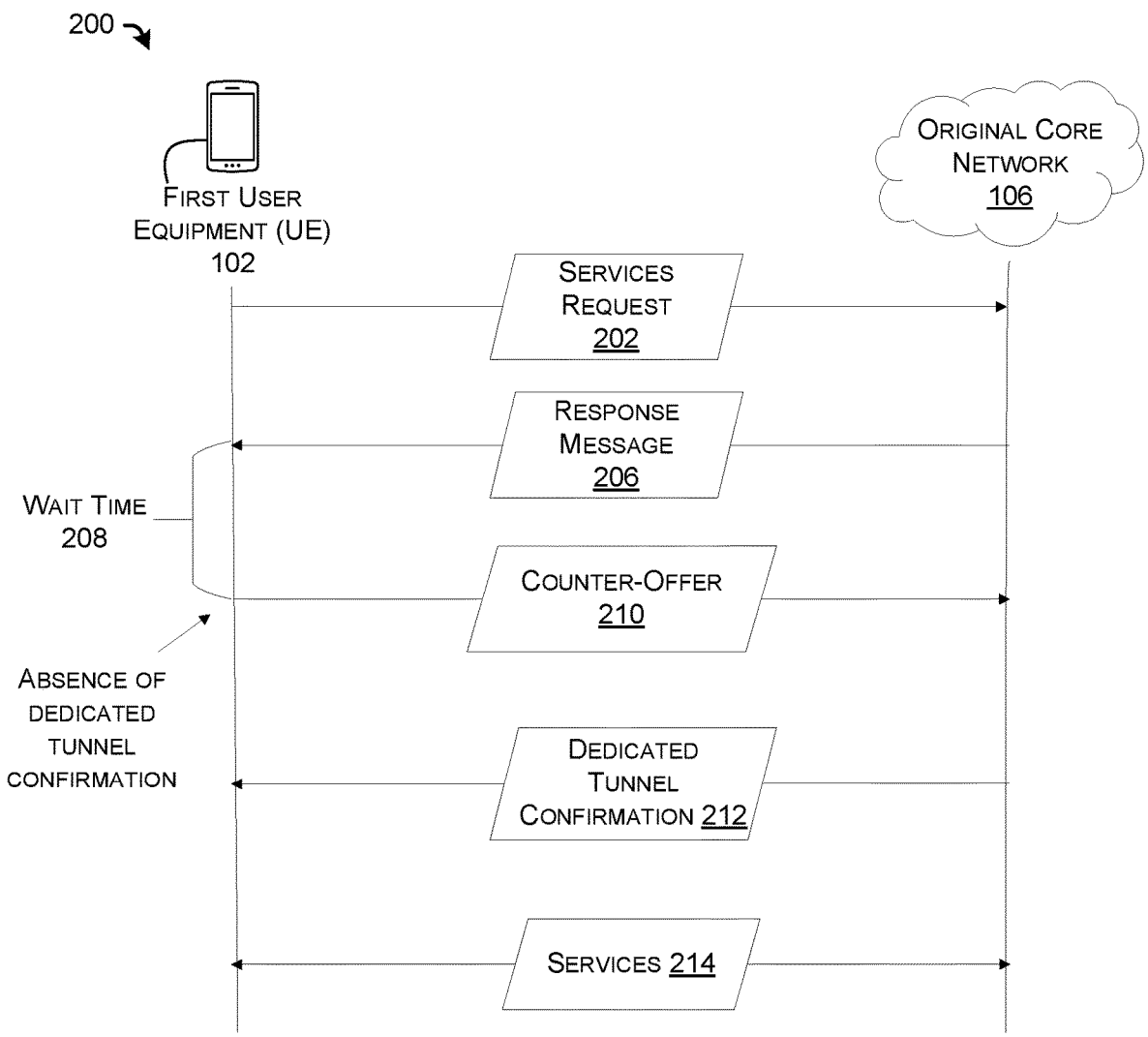
FIG. 2A illustrates example signaling for falling back to an alternative Quality of Service (QoS) level when a network-initiated dedicated tunnel is not established before a timer expires.
Figure 2B:
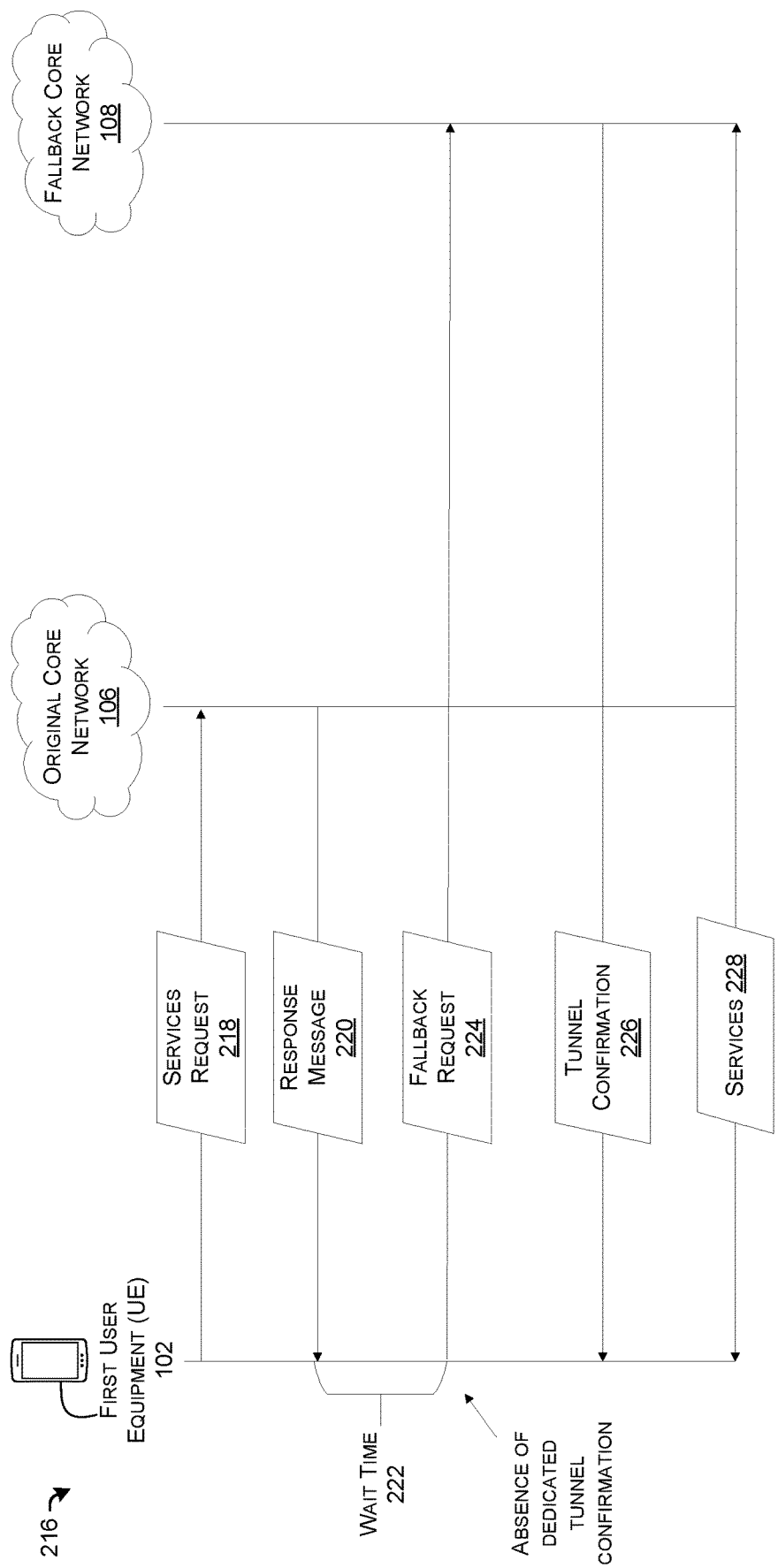
FIG. 2B illustrates example signaling for falling back to an alternate core network when a network-initiated dedicated tunnel is not established before a timer expires.

FIGS. 2A to 2C illustrate signaling for performing timer-initiated fallback, according to various implementations of the present disclosure. In particular, FIGS. 2A and 2B represent example signaling in the context of certain network-initiated policies. FIG. 2C represents example signaling in the context of certain UE-initiated policies.

FIG. 2A illustrates example signaling 200 for falling back to an alternative Quality of Service (QoS) level when a network-initiated dedicated tunnel is not established before a timer expires. The signaling 200 may include actions performed by the first User Equipment (UE) 102 and the original core network 106, which are described above with reference to FIG. 1. The The first UE 102 may transmit a services request 202 to the original core network 106. The services request 202 may include a request for a type of QoS-sensitive services. In some cases, the QoS-sensitive services may be Guaranteed Bit Rate (GBR) services.

In response to receiving the services request 202, the original core network 106 may determine that a dedicated tunnel should be established for the QoS-sensitive services. The original core network 106 may identify a QoS level associated with the services. The original core network 106 may determine at least one resource within the first network 106 that should be allocated to the dedicated tunnel in order to accommodate the QoS level.

The original core network 106 may transmit a response message 206 to the first UE 102. The response message 206 may indicate, to the first UE 102, that the original core network 106 is at least attempting to establish the dedicated tunnel for the services. In some cases, the response message 206 may indicate one or more features of the dedicated tunnel. For instance, the response message 206 may indicate the QoS level associated with the services, which may be assigned by the first core network. In some cases, the response message 206 is a SIP message. For instance, the response message may be a SIP 100 Trying response. In particular implementations, the response message 206 may include a Bearer Setup Request and Radio Resource Control (RRC) Connection Reconfiguration, wherein the Bearer Setup Request is transmitted from a Mobility Management Entity (MME) to a radio network serving the first UE 102, and the radio network transmits, in response, the RRC Connection Reconfiguration corresponding to the Bearer Setup Request.

In response to receiving the response message 206, the first UE 102 may initiate a timer associated with a wait time 208. The wait time 208 may specify a time interval by which the first UE 102 waits for a confirmation that the dedicated tunnel has been established. If the first UE 102 receives the confirmation before the wait time 208 expires, the first UE 102 may stop the timer and proceed with receiving the services over the established dedicated tunnel. However, if the wait time 208 expires without the first UE 102 having received a confirmation that the dedicated tunnel has been established, the first UE 102 may initiate a fallback solution. In particular implementations, a length of the wait time 208 may be about 5 seconds to about 30 seconds.

As illustrated in FIG. 2A, in response to the wait time expiring 208, the first UE 102 may transmit a counter-offer 210 to the original core network 106. The counter-offer 210 may indicate a fallback QoS level that is less stringent (i.e., lower) than the QoS level initially associated with the services. In some cases, the less-stringent QoS level can be determined based on one or more predetermined rules, user preferences, or the like. In some cases, the first UE 102 may guess a less-stringent QoS level that the original core network 106 is likely to accept. Accordingly, if the original core network 106 could not establish the dedicated tunnel in a timely manner due to the inability of the original core network 106 to accommodate the dedicated tunnel at the initial QoS level, the original core network 106 may nevertheless be capable of establishing a dedicated tunnel at the fallback QoS level.

Once the original core network 106 has established the dedicated tunnel at the fallback QoS level, the original core network 106 may transmit a dedicated tunnel confirmation 212 to the first UE 102. The dedicated tunnel confirmation 212 may notify the first UE 102 that the dedicated tunnel has been established at the fallback QoS level. In particular implementations, the dedicated tunnel confirmation 212 may include data indicating a context of the established dedicated tunnel.

Once the dedicated tunnel has been established at the fallback QoS level and the first UE 102 receives the dedicated tunnel confirmation 212, services 214 may be delivered to the first UE 102 via the established dedicated tunnel. The delivery of the services 214 may include the transmission of uplink data from the first UE 102 to the original core network 106 (or at least one device separated from the first UE 102 by the original core network 106) over the dedicated bearer and/or the transmission of downlink data from the original core network 106 (or at least one device separated from the first UE 102 by the original core network 106) to the first UE 102.

FIG. 2B illustrates example signaling 216 for falling back to an alternate core network when a network-initiated dedicated tunnel is not established before a timer expires. The signaling 200 may include actions performed by the first User Equipment (UE) 102, the original core network 106, and a fallback core network 108, such as the first fallback core network 108-A or the second fallback core network 108-B, which are described above with reference to FIG. 1. FIG. 2B may represent a scenario in which the original core network 106 and/or the fallback core network 108 may implement a policy in which dedicated tunnels are network-initiated.

The first UE 102 may transmit a services request 218 to the original core network 106. The services request 218 may include a request for a type of QoS-sensitive services. In some cases, the QoS-sensitive services may be Guaranteed Bit Rate (GBR) services.

In response to receiving the services request 218, the original core network 106 may determine that a dedicated tunnel should be established for the QoS-sensitive services. The original core network 106 may identify a QoS level associated with the services. The original core network 106 may determine at least one resource within the first network 106 that should be allocated to the dedicated tunnel in order to accommodate the QoS level.

The original core network 106 may transmit a response message 220 to the first UE 102. The response message 220 may indicate, to the first UE 102, that the original core network 106 is at least attempting to establish the dedicated tunnel for the services. In some cases, the response message 220 may indicate one or more features of the dedicated tunnel. For instance, the response message 220 may indicate the QoS level associated with the services, which may be assigned by the original core network 106. The QoS level may be pre-assigned by the original core network 106 to a type of the services, in various implementations. For example, the original core network 106 may pre-assign a particular QoS level for voice services and may indicate the particular QoS level in the response message 220 when the response message 220 is a response to a request for voice services. In some cases, the response message 220 is a SIP message. For instance, the response message may be a SIP 100 Trying response. In particular implementations, the response message 206 may include a Bearer Setup Request and Radio Resource Control (RRC) Connection Reconfiguration, wherein the Bearer Setup Request is transmitted from a Mobility Management Entity (MME) to a radio network serving the first UE 102, and the radio network transmits, in response, the RRC Connection Reconfiguration corresponding to the Bearer Setup Request.

In response to receiving the response message 220, the first UE 102 may initiate a timer associated with a wait time 222. The wait time 222 may specify a time interval by which the first UE 102 waits for a confirmation that the dedicated tunnel has been established. If the first UE 102 receives the confirmation before the wait time 222 expires, the first UE 102 may stop the timer and proceed with receiving the services over the established dedicated tunnel. However, if the wait time 222 expires without the first UE 102 having received a confirmation that the dedicated tunnel has been established, the first UE 102 may initiate a fallback solution.

As illustrated in FIG. 2B, in response to the wait time 222 expiring, the first UE 102 may transmit a fallback request 224 to the fallback core network 108. The fallback request 224 may be a request for the QoS-sensitive services directed to the fallback core network 108. In some cases, the fallback request 224 can include any of the information provided in the services request 218 that was transmitted to the original core network 106

In particular implementations, the first core network 108 may be able to accommodate a tunnel for delivering the services in a timely manner in accordance with the QoS requirements of the services, unlike the original core network 106. In response to receiving the fallback request 224, the fallback core network 108 may establish an appropriate tunnel for delivery of the requested services. For instance, if the fallback core network 108 includes a 4G core network, the tunnel may include a dedicated bearer by which the QoS-sensitive services can be delivered. In some examples, if the fallback core network 108 includes a 2G or 3G core network, the tunnel may include a CS voice pathway by which the QoS-sensitive services can be delivered.

Once the fallback core network 108 has established the tunnel, the first fallback core network 108 may transmit a tunnel confirmation 226 to the first UE 102. In some cases, the tunnel confirmation 226 may be received within a second wait time of transmission of the fallback request 224. The tunnel confirmation 226 may notify the first UE 102 that the tunnel (i.e., the dedicated tunnel if the fallback core network includes a 4G core network or the CS tunnel if the fallback core network 108 includes a 3G or 2G core network) has been established in the first fallback core network 108-A. In particular implementations, the tunnel confirmation 226 may include data indicating a context of the established tunnel.

Once the tunnel has been established in the fallback core network 108 and the first UE 102 receives the tunnel confirmation 226, services 228 may be delivered to the first UE 102 via the established tunnel. The delivery of the services 228 may include the transmission of uplink data from the first UE 102 to the fallback core network 108 (or at least one device separated from the first UE 102 by the fallback core network 108) over the established tunnel and/or the transmission of downlink data from the fallback core network 108 (or at least one device separated from the first UE 102 by the fallback core network 108) to the first UE 102 over the established tunnel.

Although FIGS. 2A and 2B illustrate implementations in which dedicated tunnels are network-initiated, in some examples, dedicated tunnels may be UE-initiated. For instance, any of the first UE 102, the original core network 106, and/or the fallback core network 108 may identify that the first UE 102 is responsible for defining and/or requesting network resources (e.g., resources sufficient to satisfy a particular QoS policy associated with the services) to accommodate an appropriate dedicated tunnel. In these examples, the first UE 102 may specify the resources in a services request (e.g., an equivalent of the services request 202 or the services request 218). For instance, the first UE 102 may specify a particular GBR level by which the services should be delivered in the services request. In these implementations, the first UE 102 may trigger a wait time (e.g., an equivalent of the wait time 208 or the wait time 222) in response to transmitting the services request, rather than receiving a response message. If the wait time expires without the first UE 102 having received a confirmation of the dedicated tunnel, the first UE 102 may transmit a counter-offer (e.g., an equivalent of the counter-offer 210) to the original core network 106 or a fallback request (e.g., an equivalent of the fallback request 224) to the fallback core network 108. The wait time in a UE-initiated dedicated tunnel scenario may be longer than the wait time in a network-initiated dedicated tunnel scenario.

FIG. 2C illustrates example signaling 230 for falling back to an alternate core network when a UE-initiated dedicated tunnel is not established before a timer expires. The signaling 230 may include actions performed by the first User Equipment (UE) 102, the original core network 106, and a fallback network 108, such as the first fallback core network 108-A or the second fallback core network 108-B, which are described above with reference to FIG. 1. FIG. 2C may represent a scenario in which the original core network 106 and/or the fallback core network 108 may implement a policy in which dedicated tunnels are UE-initiated.

The first UE 102 may transmit a services request 232 to the original core network 106. The services request 232 may include a request for a type of QoS-sensitive services. In some cases, the QoS-sensitive services may be Guaranteed Bit Rate (GBR) services.

In response to receiving the services request 232, the original core network 106 may determine that the UE 102 will initiate the creation of a dedicated tunnel for the QoS-sensitive services. The original core network 106 may transmit a response message 234 to the first UE 102. The response message 234 may indicate, to the first UE 102, that the original core network 106 is expecting the first UE 102 to initiate the dedicated tunnel for the services.

In response to the response message 234, the first UE 102 may transmit a tunnel setup request 236 to the original core network 106. In some cases, the tunnel setup request 236 may indicate one or more features of the dedicated tunnel. For instance, the tunnel setup request 236 may indicate a requested QoS level associated with the services. The QoS level may be pre-assigned by the first UE 102 to a type of the services, in various implementations. For example, the first UE 102 may pre-assign a particular QoS level for voice services and may indicate the particular QoS level in the tunnel setup request 236 when the services request 232 is a request for voice services. In some cases, the response message 234 and/or the tunnel setup request 236 include at least one SIP message. For instance, the response message 234 may be a SIP 100 Trying response. Although not illustrated, in some implementations, the tunnel setup request 236 is part of the services request 232.

In response to transmitting the tunnel setup request 236, the first UE 102 may initiate a timer associated with a wait time 238. The wait time 238 may specify a time interval by which the first UE 102 waits for a confirmation that the dedicated tunnel has been established. If the first UE 102 receives the confirmation before the wait time 238 expires, the first UE 102 may stop the timer and proceed with receiving the services over the established dedicated tunnel. However, if the wait time 238 expires without the first UE 102 having received a confirmation that the dedicated tunnel has been established, the first UE 102 may initiate a fallback solution.

As illustrated in FIG. 2C, in response to the wait time 238 expiring, the first UE 102 may transmit a fallback request 238 to the fallback core network 108. The fallback request 224 may be a request for the QoS-sensitive services directed to the fallback core network 108. In some cases, the fallback request 224 can include any of the information provided in the services request 232 that was transmitted to the original core network 106. Although not illustrated, in some implementations, the fallback core network 108 may transmit a response message to the first UE 102 (e.g., similar to the response message 234), and the first UE 102 may transmit a tunnel setup request (e.g., at least similar to the tunnel setup request 236) to the fallback core network 108. Accordingly, in some cases, the first UE 102 can initiate the creation of a dedicated tunnel in the fallback core network 108. However, in some cases, the fallback request 238 may be sufficient to establish a suitable tunnel in the fallback core network 108.

In particular implementations, the fallback core network 108 may be able to accommodate a tunnel for delivering the services in a timely manner in accordance with the QoS requirements of the services, unlike the original core network 106. In response to receiving the fallback request 238, the fallback core network 108 may establish an appropriate tunnel for delivery of the requested services. For instance, if the fallback core network 108 includes a 4G core network, the tunnel may include a dedicated bearer by which the QoS-sensitive services can be delivered. In some examples, if the fallback core network 108 includes a 2G or 3G core network, the tunnel may include a CS voice pathway by which the QoS-sensitive services can be delivered.

Once the fallback core network 108 has established the tunnel, the fallback core network 108 may transmit a tunnel confirmation 240 to the first UE 102. In some cases, the tunnel confirmation 240 may be received within a second wait time of transmission of the fallback request 238 (or, if the first UE 102 is initiated a dedicated tunnel with the fallback core network 108, within a second wait time of transmission of a tunnel setup request transmitted to the fallback core network 108). The tunnel confirmation 240 may notify the first UE 102 that the tunnel (i.e., the dedicated tunnel if the fallback core network includes a 4G core network or the CS tunnel if the fallback core network 108 includes a 3G or 2G core network) has been established in the first fallback core network 108-A. In particular implementations, the tunnel confirmation 240 may include data indicating a context of the established tunnel.

Once the tunnel has been established in the fallback core network 108 and the first UE 102 receives the tunnel confirmation 240, services 242 may be delivered to the first UE 102 via the established tunnel. The delivery of the services 242 may include the transmission of uplink data from the first UE 102 to the fallback core network 108 (or at least one device separated from the first UE 102 by the fallback core network 108) over the established tunnel and/or the transmission of downlink data from the fallback core network 108 (or at least one device separated from the first UE 102 by the fallback core network 108) to the first UE 102 over the established tunnel.

Figure 3:
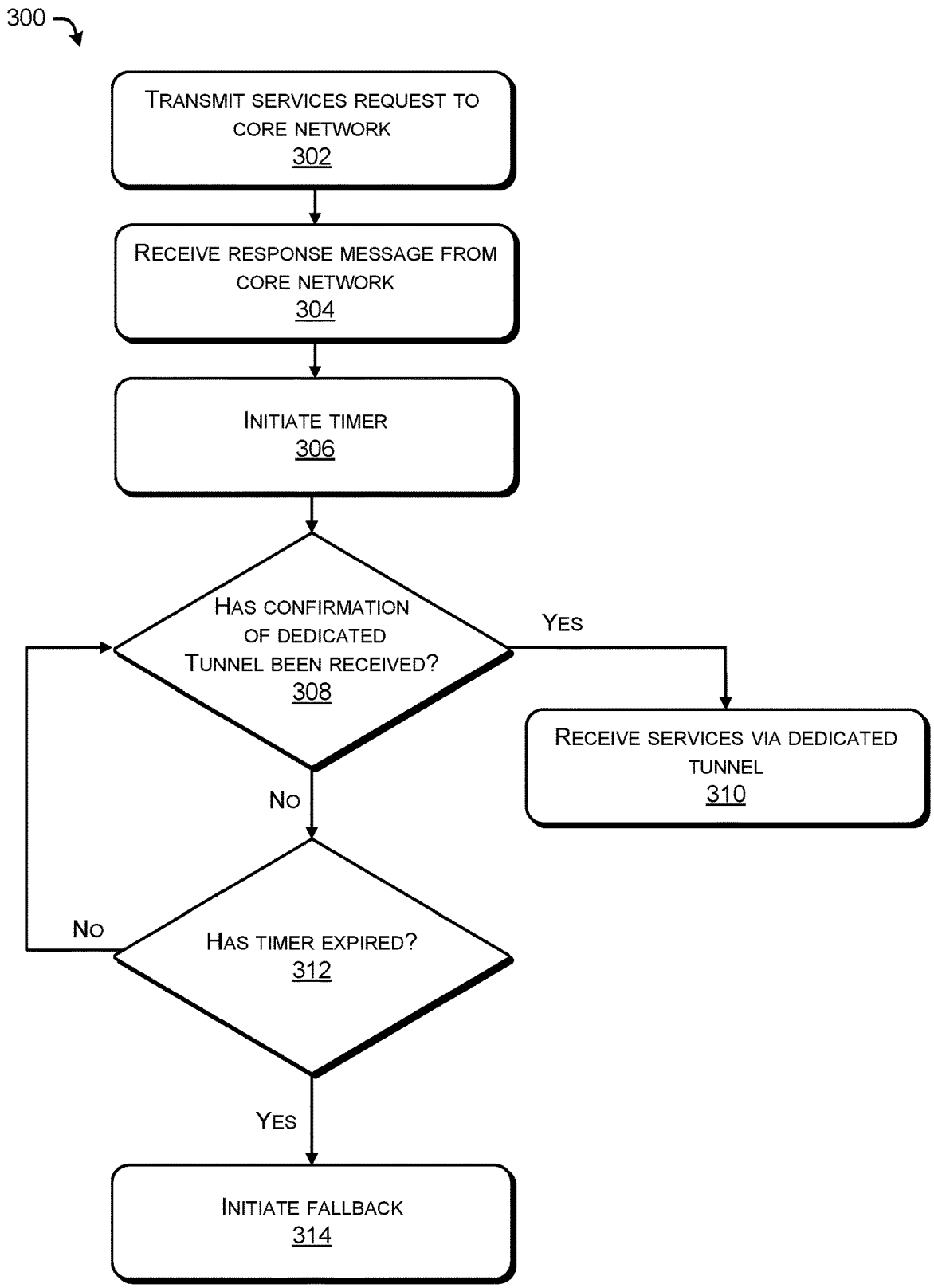
FIG. 3 illustrates an example process for performing UE-initiated fallback based on a timer.
Figure 4:
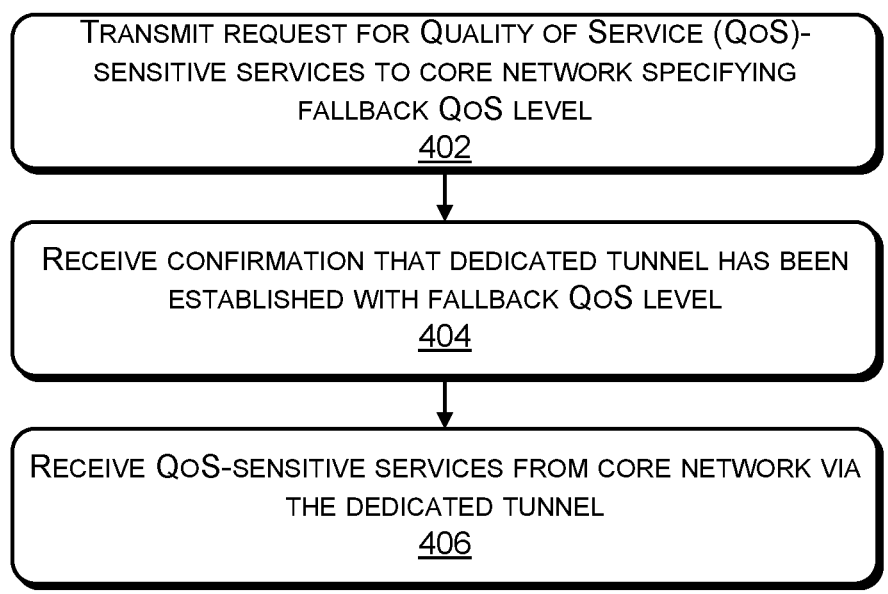
FIG. 4 illustrates an example fallback process for requesting services at a fallback QoS level.
Figure 5:
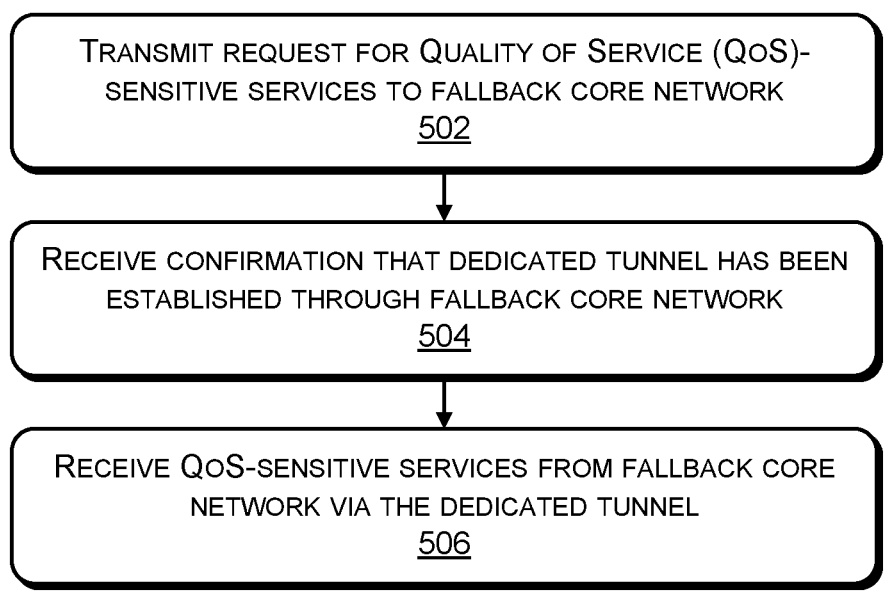
FIG. 5 illustrates an example fallback process for requesting services from a fallback core network.

FIGS. 3 through 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process 300 for performing User Equipment (UE)-initiated fallback based on a timer. In various implementations, the process 300 can be performed by a User Equipment (UE), such as the first UE 102 described above with reference to FIGS. 1 to 2B.

At 302, a services request can be transmitted to a core network. In various implementations, the services request may be a request for Quality of Service (QoS)-sensitive services, such as voice services. In some cases, the services can be Guaranteed Bit Rate (GBR) services. The services request can be, for example, a Session Initiation Protocol (SIP) message. In some cases, the services request can be a request for services from the core network and an Internet Protocol (IP) Multimedia Subsystem (IMS) network. The core network may be at least one of a 2nd (2G) network, a 3rd (3G) network, a 4th (4G) network, a 5th (5G) network, or the like.

In particular implementations, the requested services are to be delivered via a dedicated tunnel. A dedicated tunnel can include, for example, a dedicated bearer, a dedicated 5G QoS Indicator (5QI) data flow, or the like. The dedicated tunnel can be a pathway through one or more delivery networks, as well as a reserved set of resources in the delivery network(s) that can be used to prioritize delivery of the services through the delivery network(s). In some cases, the delivery network(s) can include at least one of the core network, a radio network configured to deliver data to and from the core network, or an Internet Protocol (IP) Multimedia Subsystem (IMS) network.

In some examples in which a UE-initiated policy is applicable, the services request can include a request for the core network and/or the IMS network to establish a dedicated tunnel in accordance with a QoS level (e.g., a GBR) associated with the QoS-sensitive services. Alternatively, the request to establish the dedicated tunnel can be sent separately from the services request.

At 304, a response message can be received from the core network. In various implementations in which a network-initiated policy is applicable, the response message may indicate that the core network is at least attempting to establish the dedicated tunnel through the core network and/or the IMS network, over which the requested services can be delivered. The response message may indicate the QoS level associated with the QoS-sensitive services. In scenarios in which a UE-initiated policy is applicable to the entity performing the process 300, the response message may confirm that the services request was received and/or that the core network and/or the IMS network share the UE-initiated policy. In some cases, the response message is a SIP message. For instance, the response message may be a SIP 100 Trying response. In particular implementations, the core network may initiate the setup of a dedicated tunnel to carry the requested services. For instance, the response message can include a Bearer Setup Request and a Radio Resource Control (RRC) Connection Reconfiguration, wherein the core network may transmit the Bearer Setup Request to a radio network, and the radio network may, in response, transmit the RRC Connection Reconfiguration corresponding to the Bearer Setup Request to the entity performing the process 300. The RRC Connection Reconfiguration may indicate that the core network is setting up the dedicated tunnel.

Although not illustrated in FIG. 3, in cases of some UE-initiated policies, a request for a dedicated tunnel may be transmitted to the core network. In certain examples, the request for the dedicated tunnel may be transmitted after the response message is received at 304. The request for the dedicated tunnel may specify an appropriate QoS policy for the dedicated tunnel, which may be set by a UE rather than a delivery network, such as the core network.

At 306, a timer can be initiated. According to various implementations in which a network-initiated policy is applicable, the timer may be initiated in response to receiving the response message at 304. In various implementations in which a UE-initiated policy is applicable, the timer may be initiated in response to transmitting the services request at 302 and/or transmitting the request for the dedicated tunnel. In particular implementations, the timer may count down from a wait time. A length of the wait time can be, in some cases, about 5 seconds to about 30 seconds.

At 308, the process 300 includes determining whether a confirmation of the dedicated tunnel has been received. For instance, 308 may include determining whether information about a context of an established dedicated tunnel has been received.

If the confirmation is determined to have been received at 308, the process 300 proceeds to 310. At 310, the services can be received via the established dedicated tunnel. For instance, the received context information can be used to exchange services with a remote device (e.g., a UE, a content server, or the like) via the dedicated tunnel.

If the confirmation is determined to have not been received at 308, the process 300 proceeds to 312. At 312, the process 300 can include determining whether the timer has expired. If the timer is determined to have not expired at 312, the process 300 returns to 308. For instance, the process 300 includes waiting for the confirmation of the dedicated tunnel at least as long as the wait time.

If, however, the timer is determined to have expired at 312, the process 300 continues to 314. The expiration of the timer may indicate that there was a problem with establishing the dedicated tunnel. For instance, a node or interface associated with the radio network, the core network, and/or the IMS network may be malfunctioning or may be interrupted. At 314, fallback can be initiated. In some cases, fallback may include transmitting a counter-offer to the core network that specifies a less-stringent, but acceptable, QoS level at which the services can be delivered. In certain examples, fallback may include requesting the services from an alternate core network.

In various instances, the process 300 may enable a UE to initialize fallback when there is a problem (e.g., causing prevention or delay) with establishing a dedicated tunnel through at least one delivery network.

FIG. 4 illustrates an example fallback process 400 for requesting services at a fallback Quality of Service (QoS) level. In various implementations, the process 500 can be performed by a User Equipment (UE), such as the first UE 102 described above with reference to FIGS. 1 to 2B. In some instances, the process 400 can be performed after the UE requested services from a core network at an original QoS level, and the core network failed to establish a dedicated tunnel with the original QoS level by which the services could be delivered.

At 402, a request for QoS-sensitive services may be transmitted to a core network. The request may specify a fallback QoS level associated with the services. In various implementations, the fallback QoS level may be less stringent than the original QoS level associated with the QoS-sensitive services. For instance, if the services are Guaranteed Bit Rate (GBR) services originally associated with a predetermined maximum acceptable latency, the fallback QoS level may correspond to a longer maximum acceptable latency than the predetermined maximum acceptable latency.

The request can be, for example, a Session Initiation Protocol (SIP) message. In some cases, the request can be a request for services from the core network and an Internet Protocol (IP) Multimedia Subsystem (IMS) network. The core network may be at least one of a 2nd (2G) network, a 3rd (3G) network, a 4th (4G) network, a 5th (5G) network, or the like.

In particular implementations, the requested QoS-sensitive services are to be delivered via a dedicated tunnel. A dedicated tunnel can include, for example, a dedicated bearer, a dedicated 5G QoS Indicator (5QI) data flow, or the like. The dedicated tunnel can be a pathway through one or more delivery networks, as well as a reserved set of resources in the delivery network(s) that can be used to prioritize delivery of the services through the delivery network(s). In some cases, the delivery network(s) can include at least one of the core network, a radio network configured to deliver data to and from the core network, or the IMS network.

At 404, a confirmation can be received. In some cases, the confirmation can be received within a wait time (e.g., a time interval between about 5 seconds and 30 seconds) of the transmission of the request at 402. The confirmation may indicate that a dedicated tunnel has been established with the fallback QoS level. In some instances, the delivery network(s) may have enough resources to establish a dedicated tunnel at the fallback QoS level but may have lacked the resources to establish a dedicated tunnel at the original QoS level associated with the requested services. Accordingly, the fallback QoS level may enable the establishment of the dedicated tunnel.

At 406, the QoS-sensitive services can be received from the core network via the dedicated tunnel. Because the dedicated tunnel has been established, even at the fallback QoS level, the QoS-sensitive services may be received from the delivery network(s).

FIG. 5 illustrates an example fallback process 500 for requesting services from a fallback core network. In various implementations, the process 500 can be performed by a User Equipment (UE), such as the first UE 102 described above with reference to FIGS. 1 to 2B. In some instances, the process 500 can be performed after the UE requested services from an original core network and the original core network failed to establish a dedicated tunnel by which the services could be delivered.

At 502, a request for Quality of Service (QoS)-sensitive services can be transmitted to a fallback core network. In various implementations, the services request may be a request for Quality of Service (QoS)-sensitive services, such as voice services. In some cases, the services can be Guaranteed Bit Rate (GBR) services. The services request can be, for example, a Session Initiation Protocol (SIP) message. In some cases, the services request can be a request for services from the core network and an Internet Protocol (IP) Multimedia Subsystem (IMS) network. The fallback core network may be at least one of a 2G network, a 3G network, a 4G network, a 5G network, or the like. In some cases, the fallback core network is associated with a different network technology than the original core network. For instance, the fallback core network can be a 2G network, a 3G network, or a 4G network, and the original core network can be a 5G network.

In particular implementations, the requested services are to be delivered via a dedicated tunnel. A dedicated tunnel can include, for example, a dedicated bearer, a dedicated 5G QoS Indicator (5QI) data flow, or the like. The dedicated tunnel can be a pathway through one or more delivery networks, as well as a reserved set of resources in the delivery network(s) that can be used to prioritize delivery of the services through the delivery network(s). In some cases, the delivery network(s) can include at least one of the fallback core network, a radio network configured to deliver data to and from the fallback core network, or an IMS network.

At 504, a confirmation that a dedicated tunnel has been establish ed through the fallback core network can be received. In some cases, the confirmation can be received within a wait time (e.g., a time interval between about 5 seconds and 30 seconds) of the transmission of the request at 502. The confirmation may indicate that a dedicated tunnel has been established by the fallback core network. In some instances, the fallback core network may have enough resources to establish the dedicated tunnel, even though the original core network may have lacked the resources to establish the dedicated tunnel. Accordingly, the fallback core network may enable the establishment of the dedicated tunnel.

At 506, the QoS-sensitive services can be received from the fallback core network via the dedicated tunnel. Because the dedicated tunnel has been established, even in the fallback core network, the QoS-sensitive services may be received from the delivery network(s).

Figure 6:
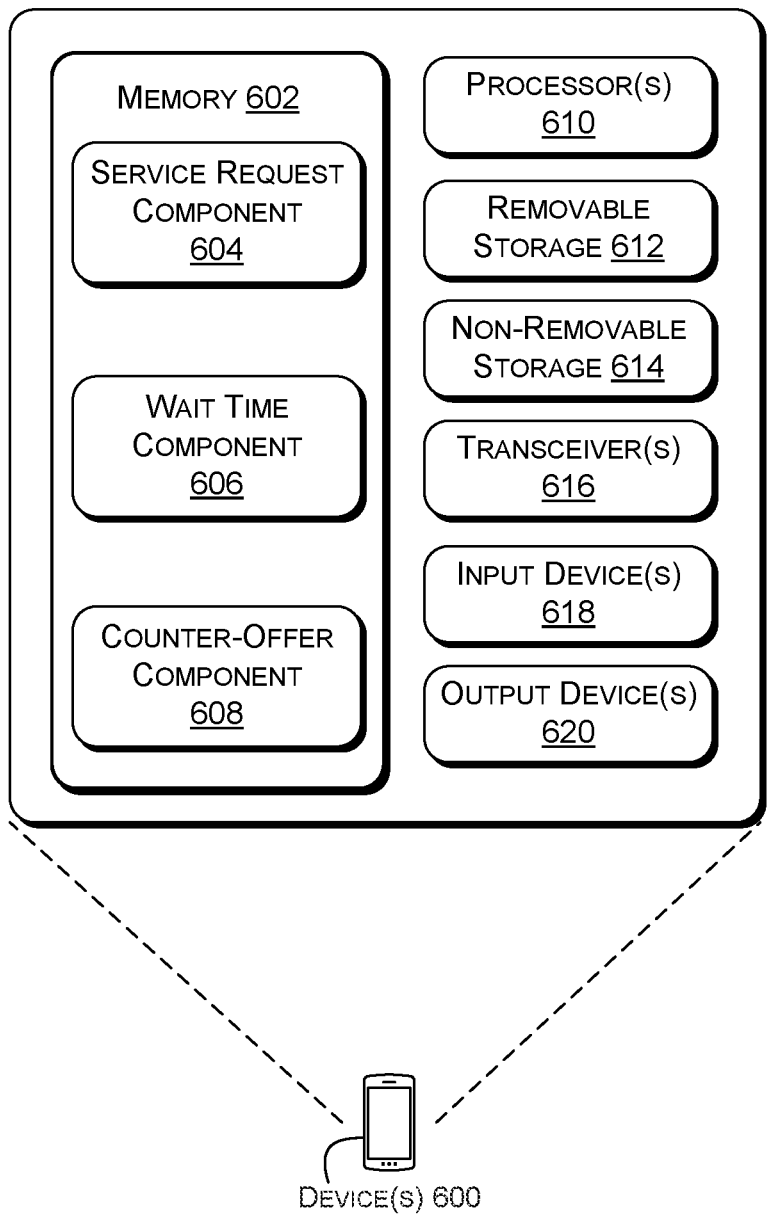
FIG. 6 illustrates example device(s) configured to perform user-initiated fallback based on a timer.

FIG. 6 illustrates example device(s) 600 configured to perform user-initiated fallback based on a timer. In some embodiments, some or all of the functionality discussed in connection with FIGS. 1-5 can be implemented in the device(s) 600. Further, the device(s) 600 can be implemented as one or more server computers, a network element on a dedicated hardware, as a software instance running on a dedicated hardware, or as a virtualized function instantiated on an appropriate platform, such as a cloud infrastructure, and the like. It is to be understood in the context of this disclosure that the device(s) 600 can be implemented as a single device or as a plurality of devices with components and data distributed among them.

As illustrated, the device(s) 600 comprise a memory 602. In various embodiments, the memory 602 is volatile (including a component such as Random Access Memory (RAM)), non-volatile (including a component such as Read Only Memory (ROM), flash memory, etc.) or some combination of the two.

The memory 602 may include various components, such as at least one service request component 604 and at least one wait time component 606. The service request component 604 may include instructions for requesting services from a core network (e.g., an original core network or a fallback core network). The wait time component 606 may include instructions for determining that a wait time has expired without receiving confirmation that a dedicated tunnel has been established, as well as for taking certain actions based on the determination. The counter-offer component 608 may include instructions for generating and providing a counter-offer to a core network, for instance, after a dedicated tunnel was not established in the core network within the wait time. The service request component 604, the wait time component 606, the counter-offer component 608, and various other elements stored in the memory 602 can comprise methods, threads, processes, applications, or any other sort of executable instructions. The service request component 604, the wait time component 606, the counter-offer component 608, and various other elements stored in the memory 602 can also include files and databases.

The memory 602 may include various instructions (e.g., instructions in the service request component 604, the wait time component 606, and/or the counter-offer component 608), which can be executed by at least one processor 608 to perform operations. In some embodiments, the processor(s) 610 includes a Central Processing Unit (CPU), a Graphics Processing Unit (GPU), or both CPU and GPU, or other processing unit or component known in the art.

The device(s) 600 can also include additional data storage devices (removable and/or non-removable) such as, for example, magnetic disks, optical disks, or tape. Such additional storage is illustrated in FIG. 6 by removable storage 612 and non-removable storage 614. Tangible computer-readable media can include volatile and nonvolatile, removable and non-removable media implemented in any method or technology for storage of information, such as computer readable instructions, data structures, program modules, or other data. The memory 602, removable storage 612, and non-removable storage 612 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 600. Any such tangible computer-readable media can be part of the device(s) 600.

As illustrated in FIG. 6, the device(s) 600 can also include one or more wired or wireless transceiver(s) 616. For example, the transceiver(s) 616 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 616 can utilize Multiple-Input/Multiple-Output (MIMO) technology. The transceiver(s) 616 can include any sort of wireless transceivers capable of engaging in wireless, Radio Frequency (RF) communication. The transceiver(s) 616 can also include other wireless modems, such as a modem for engaging in Wi-Fi, WiMAX, Bluetooth, or infrared communication.

The device(s) 600 also can include input device(s) 618, such as a keypad, a cursor control, a touch-sensitive display, voice input device, etc., and output device(s) 620 such as a display, speakers, printers, etc. These devices are well known in the art and need not be discussed at length here. In particular implementations, a user can provide input to the device(s) 600 via a user interface associated with the input device(s) 618 and/or the output device(s) 620.

Example Clauses

Various implementations disclosed herein are indicated in the following example clauses. However, the scope of this application is not limited to any one of the example clauses recited below.

- A. A method performed by a User Equipment (UE), the method including: identifying a policy indicating a dedicated bearer is network-initiated; initiating a call by transmitting a first Session Initiation Protocol (SIP) message to a core network, the SIP message requesting voice services from the core network and an Internet Protocol (IP) Media Subsystem (IMS) network; receiving a second SIP message from the core network; in response to receiving the second SIP message, initiating a timer; determining the timer has expired without having received a confirmation of the dedicated bearer associated with delivery of the voice services through the core network and the IMS network having been established; and in response to determining that the timer has expired without receiving the confirmation, initiating a fallback option for the call.
- B. The method of clause A, wherein the dedicated bearer is a first dedicated bearer and the core network is a first core network associated with a first network technology, and wherein initiating the fallback option includes: transmitting, to a second core network associated with a second network technology, a request for a second dedicated bearer associated with delivery of the voice services; receiving a confirmation of the second dedicated bearer from the second core network; and receiving the voice services from the second core network via the second dedicated bearer.
- C. The method of clause A or B, the dedicated bearer being a first dedicated bearer associated with a first guaranteed Quality of Service (QoS) level, wherein initiating the fallback option includes: transmitting, to the core network, a request for a second dedicated bearer associated with a second guaranteed QoS level, the second guaranteed QoS level being lower than the first guaranteed QoS level; receiving a confirmation of the second dedicated bearer from the core network; and receiving the voice services from the core network via the second dedicated bearer.
- D. A method performed by a User Equipment (UE) implementing a network-initiated policy, the method including: receiving, from a first core network, a message associated with Quality of Service (QoS) sensitive services; in response to receiving the message, initiating a timer; determining that the timer has expired without having received a confirmation that a 5th Generation (5G) QoS Indicator (5QI) data flow associated with the QoS-sensitive services has been established in the first core network; and in response to determining that the timer has expired, initiating a fallback process.
- E. The method of clause D, further including: transmitting, to the first core network, a Session Initiation Protocol (SIP) INVITE message requesting the QoS-sensitive services, wherein the message associated with the QoS-sensitive services is a SIP 100 Trying response.
- F. The method of clause D or E, wherein the message indicates a Quality of Service (QoS) level of the 5QI data flow that is assigned by the core network.
- G. The method of clause F, wherein the QoS level includes at least one of a priority of the QoS-sensitive services, a maximum packet delay budget of the QoS-sensitive services, or a maximum packet error loss rate of the QoS-sensitive services.
- H. The method of any one of clauses D to G, wherein the timer expires about 5 seconds to about 30 seconds after initiating the timer.
- I. The method of any one of clauses D to H, wherein the first core network is associated with a first network technology, and wherein initiating the fallback process includes: transmitting, to a second core network associated with a second network technology, a request for the QoS-sensitive services; receiving, from the second core network, a confirmation that a dedicated bearer has been established through the second core network; and receiving, from the second core network, the QoS-sensitive services via the dedicated bearer.
- J. The method of clause I, wherein the first network technology is a 5G network technology and the second network technology is a 4th Generation (4G) network technology or a Circuit-Switched (CS) network technology.
- K. The method of any of clauses D to J, the 5QI data flow being a first 5QI data flow associated with a first guaranteed QoS level, wherein initiating the fallback option includes: transmitting, to the core network, a request for a second 5QI data flow associated with a second guaranteed QoS level, the second guaranteed QoS level being lower than the first guaranteed QoS level; receiving, from the core network, a confirmation that the second 5QI data flow has been established through the core network; and receiving, from the score network, the QoS-sensitive services via the second 5QI data flow.
- L. A device implementing a network-initiated policy, the device including: at least one processor; and memory storing instructions that, when executed by the at least one processor, cause the at least one processor to perform operations including: the method of any one of clauses A to K.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a User Equipment (UE), the method comprising:
   identifying a policy indicating a first dedicated bearer associated with a first guaranteed Quality of Service (QoS) level is network-initiated, the first dedicated bearer being used to establish voice services through a core network and an Internet Protocol (IP) Media Subsystem (IMS) network;
   initiating a call by transmitting a first Session Initiation Protocol (SIP) message to the core network, the first SIP message requesting the voice services from the core network and the IMS network;
   receiving a second SIP message from the core network;
   in response to the second SIP message being received as a dedicated bearer establishment request message including a request to establish the dedicated bearer, triggering a timer associated with a wait time to start;
   determining, as an expired timer, the timer at expiration of the wait time, without a confirmation of establishment of the dedicated bearer associated with delivery of the voice services through the core network and the IMS network having been received; and
   in response to the expired timer being associated with a start time at which the dedicated bearer establishment request message has been received, and an expiration time at which establishment of the first dedicated bearer has not been confirmed, initiating a fallback option for the call,
   wherein initiating the fallback option comprises transmitting, to the core network, a request for a second dedicated bearer associated with a second guaranteed QoS level, the second guaranteed QoS level being lower than the first guaranteed QoS level; receiving a confirmation of the second dedicated bearer from the core network; and receiving the voice services from the core network via the second dedicated bearer.

2. The method of claim 1, wherein the core network is associated with a 5G network technology, and
   wherein initiating the fallback option comprises:
   transmitting, to the core network the request for the second dedicated bearer being associated with delivery of the voice services via a second core network, the second core network being associated with a 4th Generation (4G) network technology or a Circuit-Switched (CS) network technology;
   receiving the confirmation of the second dedicated bearer from the second core network; and
   receiving the voice services from the second core network via the second dedicated bearer.

3. The method of claim 1, wherein the request to establish the dedicated bearer indicates a QoS level associated with the voice services.

4. The method of claim 1, wherein the wait time is associated with a time interval by which the UE waits before causing a connection associated with the core network to be reset.

5. A method performed by a User Equipment (UE) implementing a network-initiated policy, the method comprising:
   receiving, from a core network, a message including a request to establish Quality of Service (QoS)-sensitive services;
   in response to the message, initiating a timer associated with a wait time;
   determining, as an expired timer, the timer at expiration of the wait time, without having received a confirmation that a first 5th Generation (5G) QoS Indicator (5QI) data flow associated with a first guaranteed QoS level has been established in the core network; and
   in response to the expired timer being associated with a start time at which establishment of the first 5G 5QI data flow has been requested, and an end time at which establishment of the first 5QI data flow has not been confirmed, initiating a fallback process,
   wherein initiating the fallback process comprises transmitting, to the core network, a request for a second 5QI data flow associated with a second guaranteed QoS level, the second guaranteed QoS level being lower than the first guaranteed QoS level; receiving, from the core network, a confirmation that the second 5QI data flow has been established through the core network; and receiving, from the core network, the QoS-sensitive services via the second 5QI data flow.

6. The method of claim 5, further comprising:
   transmitting, to the core network, a Session Initiation Protocol (SIP) INVITE message requesting the QoS-sensitive services,
   wherein the message including the request to establish the QoS-sensitive services is a SIP 100 Trying response.

7. The method of claim 5, wherein the message indicates a QoS level of the first 5QI data flow that is assigned by the core network.

8. The method of claim 7, wherein the QoS level comprises at least one of a priority of the QoS-sensitive services, a maximum packet delay budget of the QoS-sensitive services, or a maximum packet error loss rate of the QoS-sensitive services.

9. The method of claim 5, wherein the core network is a first core network associated with a first network technology, and
   wherein initiating the fallback process comprises:
   transmitting, to a second core network associated with a second network technology, a request to establish second QoS-sensitive services;
   receiving, from the second core network, a confirmation that a dedicated bearer has been established through the second core network; and
   receiving, from the second core network, the QoS-sensitive services via the dedicated bearer.

10. The method of claim 9, wherein the first network technology is a 5G network technology and the second network technology is a 4th Generation (4G) network technology or a Circuit-Switched (CS) network technology.

11. The method of claim 5, wherein:
   the message is a SIP 100 Trying response; and
   the timer is triggered to start at the start time at which the SIP 100 Trying response is received.

12. The method of claim 5, wherein the wait time is associated with a time interval by which the UE waits before causing a connection associated with the core network to be reset.

13. A device implementing a network-initiated policy, the device comprising:
- at least one processor; and
- memory storing instructions that, when executed by the at least one processor, cause the at least one processor to perform operations comprising:
  - receiving, from a core network, a message including a request to establish Quality of Service (QoS)-sensitive services;
  - in response to the message, initiating a timer associated with a wait time;
  - determining, as an expired timer, the timer at expiration of the wait time, without having received a confirmation that a first 5th Generation (5G) QoS Indicator (5QI) data flow associated with a first guaranteed QoS level the QoS-sensitive services has been established in the core network; and
  - in response to the expired timer associated with a start time at which establishment of the first 5G 5QI data flow has been requested, and an end time at which establishment of the first 5QI data flow has not been confirmed, initiating a fallback process,
  - wherein initiating the fallback process comprises transmitting, to the core network, a request for a second 5QI data flow associated with a second guaranteed QoS level, the second guaranteed QoS level being lower than the first guaranteed QoS level; receiving, from the core network, a confirmation that the second 5QI data flow has been established through the core network; and receiving, from the core network, the QoS-sensitive services via the second 5QI data flow.

14. The device of claim 13, wherein the operations further comprise:
- transmitting, to the core network, a Session Initiation Protocol (SIP) INVITE message requesting the QoS-sensitive services, and
- wherein the message including the request to establish with the QoS-sensitive services is a SIP 100 Trying response.

15. The device of claim 13, wherein the message indicates a QoS level of the first 5QI data flow that is assigned by the core network.

16. The device of claim 15, wherein the QoS level comprises at least one of a priority of the QoS-sensitive services, a maximum packet delay budget of the QoS-sensitive services, or a maximum packet error loss rate of the QoS-sensitive services.

17. The device of claim 13, wherein the timer expires 5 seconds to 30 seconds after initiating the timer.

18. The device of claim 13, wherein the QoS-sensitive services are first QoS-sensitive services, and the core network is a first core network associated with a first network technology, and
- wherein initiating the fallback process comprises:
  - transmitting, to a second core network associated with a second network technology, a request to establish second QoS-sensitive services;
  - receiving, from the second core network, a confirmation that a dedicated bearer has been established through the second core network; and
  - receiving, from the second core network, the second QoS-sensitive services via the dedicated bearer.

19. The device of claim 13, wherein the second guaranteed QoS level comprises at least one of a lower priority of the QoS-sensitive services than a priority associated with the first guaranteed QoS level, a larger maximum packet delay budget of the QoS-sensitive services than a maximum packet delay budget associated with the first guaranteed QoS level, or a larger maximum packet error loss rate of the QoS-sensitive services than a maximum packet error loss rate associated with the first guaranteed QoS level.

20. The device of claim 13, wherein the wait time is associated with a time interval by which the device waits before causing a connection associated with the core network to be reset.

* * * * *